United States Patent
Dehennau et al.

(10) Patent No.: US 9,327,427 B2
(45) Date of Patent: May 3, 2016

(54) METHOD FOR PRODUCING A PVC-BASED COMPOSITE PLATE AND STRUCTURE INCLUDING ONE SUCH PLATE

(75) Inventors: Claude Dehennau, Waterloo (BE); Dominique Grandjean, Brussels (BE)

(73) Assignee: SOLVAY (Societe Anonyme), Brussels (BE)

( * ) Notice: Subject to any disclaimer, the term of this patent is extended or adjusted under 35 U.S.C. 154(b) by 1788 days.

(21) Appl. No.: 12/515,693

(22) PCT Filed: Nov. 26, 2007

(86) PCT No.: PCT/EP2007/062787
§ 371 (c)(1),
(2), (4) Date: May 20, 2009

(87) PCT Pub. No.: WO2008/065061
PCT Pub. Date: Jun. 5, 2008

(65) Prior Publication Data
US 2010/0075104 A1    Mar. 25, 2010

(30) Foreign Application Priority Data
Nov. 27, 2006   (FR) ...................... 06 10367

(51) Int. Cl.
| | |
|---|---|
| B32B 3/12 | (2006.01) |
| B29C 67/00 | (2006.01) |
| B32B 27/30 | (2006.01) |
| B29B 15/10 | (2006.01) |
| B29C 70/08 | (2006.01) |
| B29C 70/16 | (2006.01) |
| B29C 70/46 | (2006.01) |
| B29K 27/06 | (2006.01) |
| B29L 31/10 | (2006.01) |
| B29L 31/60 | (2006.01) |

(52) U.S. Cl.
CPC ............. B29B 15/105 (2013.01); B29C 70/086 (2013.01); B29C 70/16 (2013.01); B29C 70/465 (2013.01); B32B 3/12 (2013.01); B29K 2027/06 (2013.01); B29L 2031/10 (2013.01); B29L 2031/608 (2013.01); Y10T 428/24149 (2015.01); Y10T 428/24157 (2015.01); Y10T 428/249991 (2015.04)

(58) Field of Classification Search
CPC ............. Y10T 428/249991; Y10T 428/24157; Y10T 428/24149; B29K 2027/06; B29L 2031/608; B29L 2031/10; B29B 15/105; B32B 3/12; B29C 70/16; B29C 70/086; B29C 70/465
USPC .......................................................... 264/437
See application file for complete search history.

(56) References Cited

U.S. PATENT DOCUMENTS

| | | | | |
|---|---|---|---|---|
| 3,297,791 | A * | 1/1967 | Heaps ............................ 525/86 |
| 3,557,256 | A * | 1/1971 | Pardo ................... C08F 259/04 |
| | | | | 264/331.15 |
| 4,391,948 | A * | 7/1983 | Falk et al. ....................... 525/57 |
| 4,455,398 | A | 6/1984 | Budich et al. |
| 4,543,288 | A | 9/1985 | Radvan et al. |
| 4,606,959 | A * | 8/1986 | Hillinger ....................... 428/116 |
| 5,151,032 | A * | 9/1992 | Igawa ............................ 434/409 |
| 6,042,765 | A * | 3/2000 | Sugahara ................ B29C 44/32 |
| | | | | 264/257 |
| 6,673,415 | B1 * | 1/2004 | Yamazaki et al. ............ 428/117 |
| 6,733,845 | B1 * | 5/2004 | Caramaro et al. ............ 427/477 |
| 2002/0136862 | A1 | 9/2002 | Dong et al. |
| 2006/0233966 | A1 | 10/2006 | Marduel |
| 2006/0234028 | A1 * | 10/2006 | Pardo .................. B29C 37/0025 |
| | | | | 428/304.4 |

FOREIGN PATENT DOCUMENTS

| | | | |
|---|---|---|---|
| EP | 1525969 A1 | 4/2005 | |
| EP | 1924420 A1 | 5/2008 | |
| JP | 2258255 A | 10/1990 | |
| WO | WO 99/22920 A1 | 5/1999 | |
| WO | WO 01/98064 A2 | 12/2001 | |
| WO | WO 02/26463 A2 | 4/2002 | |
| WO | WO 2005/038123 A1 | 4/2005 | |
| WO | WO 2005/038125 A1 | 4/2005 | |
| WO | WO 2006/033101 A2 | 3/2006 | |
| WO | WO 2006/045723 A1 | 5/2006 | |

OTHER PUBLICATIONS

Woods, ME, Lee, YM & Veith, CA. 'New PVC and long glass fiber composites'. VINYLTEC 2000 Publisher: Society of Plastics Engineers, Brookfield, Conn. : Rigid PVC in the New Millennium: Innovations, Applications, Properties, Oct. 11-12, 2000, Philadelphia, pp. 203-206 (4 pp.).

Gabriele, MC & Grande, JA. 'Long-glass-fibre extrusion is done with thermoplastics'. Modern Plastics International [ISSN 0026-8283], Oct. 1997, vol..27, N. 10, pp. 31-32 (2 pp.).

[Unknown Author], "Breakthrough in PVC reinforcement with long fibre", High Performance Plastics [ISSN 0264-7753], May 1999, N. 5, p. 10 (1 p.).

\* cited by examiner

*Primary Examiner* — Alison L Hindenlang
*Assistant Examiner* — Jerzi H Moreno Hernandez
(74) *Attorney, Agent, or Firm* — Oblon, McClelland, Maier & Neustadt, L.L.P.

(57) ABSTRACT

Process for manufacturing composite sheets based on PVC and a network of long fibers, said process comprising the following steps:
- dispersing PVC in powder form in said network;
- subjecting the dispersion to an alternating electric field with a sufficient intensity and for a sufficient time in order to distribute the powder in the network; and
- heating the dispersion under pressure until the powder forms a continuous matrix.

15 Claims, No Drawings

METHOD FOR PRODUCING A PVC-BASED COMPOSITE PLATE AND STRUCTURE INCLUDING ONE SUCH PLATE

CROSS-REFERENCE TO RELATED APPLICATIONS

This application is a National Stage of PCT/EP2007/062787, which was filed on Nov. 26, 2007. This application is based upon and claims the benefit of priority to French Application No. 0610367, which was filed on Nov. 27, 2006.

BACKGROUND OF THE INVENTION

The present invention relates to a process for manufacturing PVC-based composite sheets, and also structures that include such sheets, and in particular structures that have a cellular core and at least one such sheet as reinforcement.

In many industries (automotive, structural engineering, shipbuilding, etc.), the aim is to optimize the mechanical properties/weight ratio of the structures used. Many methods have been developed to achieve this objective and one of the most common ones consists in using a honeycomb cellular structure optionally sandwiched between two sheets called "skins". By combining this technique with the choice of a lightweight material (a polymer rather than a metal), particularly lightweight structures may be obtained.

Application WO 2006/045723 in the name of the Applicant describes a particularly advantageous structure that has a cellular core comprising a honeycomb structure based on PVC (polyvinyl chloride) filled with PUR (polyurethane) foam and two outer PVC layers. Such a structure not only has good performance with respect to the mechanical properties/weight ratio of the structures, but it may also have an excellent fire resistance by means of an appropriate choice of the compositions of the resins (PVC and PUR formulations classified independently as M1 according to the NFP 92.507 standard). This application presents the use of biaxially-oriented PVC sheets as being advantageous (especially for further improving the aforementioned ratio).

An alternative means of increasing the mechanical properties while keeping the weight the same or of reducing the thickness (and hence the weight) while keeping similar mechanical properties would consist in using composite sheets, i.e. sheets that include a reinforcement. From this point of view, "long" fibrous reinforcements (i.e. fibers which have an average length of the order of cm) are renowned for conferring a more pronounced improvement in the tensile behaviour (modulus and strength measured on sheets of equal thicknesses) than "short" fibrous reinforcements (length of the order of mm), and also an increase in the thermal resistance, a better dimensional stability and a better impact resistance. However, with PVC, which is a polymer that does not melt but which can be gelled (i.e. to form a homogeneous mass where the PVC grains have lost their shape and their identity) under condition of being highly melt-kneaded, the use of such "long" reinforcements is difficult and the length of these reinforcements is in any case substantially reduced at the end of this operation. This drawback (reduction in the fiber length) is furthermore also encountered with meltable crystalline polymers when they are processed by kneading (extrusion for example).

Alternative processes have therefore been proposed in order to be able to incorporate polymers into woven or nonwoven fibrous supports, and to thus obtain woven or nonwoven fibrous reinforcements/polymer composites. Some of these processes consist of a coating of said supports/reinforcements using a latex or a solution of the polymer, followed by an evaporation of the water or of the solvent. Such a technique is costly from an energy viewpoint and does not often allow a good dispersion of the polymer inside the substrate.

Applications WO 99/22920 and WO 2005/038123 propose an improved process that consists in dispersing polymer powder (dry particles) in a network of fibers or filaments using an alternating electric field and then in moulding the resulting ensemble by heating and pressing to form sheets. This process has the advantage of obtaining a more compact composite where the fibers are well impregnated with polymer, at a lower cost. However, the powders exemplified in these applications are either powders of crystalline polymers, which are easy to melt in the matrix, or powders of thermosetting resins that do not require kneading in order to be used.

The Applicant has surprisingly observed that this process also gave good results with PVC, whereas a priori it was not obvious that PVC distributed in a fibrous network and simply hot pressed would be able to gel.

BRIEF SUMMARY OF THE INVENTION

Hence, the present invention relates to a process for manufacturing composite sheets based on PVC and a network of long fibers, said process comprising the following steps:
dispersing PVC in powder form in said network;
subjecting the dispersion to an alternating electric field with a sufficient intensity and for a sufficient time in order to distribute the powder in the network; and
heating the dispersion under pressure until the powder forms a continuous matrix.

DETAILED DESCRIPTION OF THE INVENTION

Within the context of the invention, the term "PVC" is understood to mean the homopolymers and copolymers derived from vinyl chloride (VC). The expression "copolymers derived from vinyl chloride" is understood to mean, in the present description, copolymers containing at least 50%, and preferably at least 70%, by weight of monomer units derived from vinyl chloride. Copolymers containing around 75% to around 95% by weight of vinyl chloride are preferred. As examples of comonomers that are copolymerizable with vinyl chloride, mention may be made of unsaturated olefinic monomers, such as ethylene, propylene and styrene, and esters such as vinyl acetate (VAC) and alkyl acrylates and methacrylates. The present invention is particularly well suited to VC homopolymers and VC/VAC copolymers.

Use is preferably made, within the context of the invention, of fluid PVCs, i.e. PVCs having a low melt viscosity index or K-value (conventionally known as $K_w$ or K-wert), i.e. less than or equal to 68, preferably 60, and most particularly preferably less than or equal to 58. For practical reasons (commercial availability), the PVC used in the context of the invention generally has a $K_w$ greater than or equal to 50. It should however be noted that more fluid grades would no doubt be suitable.

The particle size of the PVC powder used is preferably fine. Thus, the average diameter of the particles is preferably less than or equal to 300 µm, or even 200 µm and most particularly preferably 150 µm.

Within the context of the invention, commercial blends that include a standard PVC powder and customary additives such as stabilizers, pigments, lubricants, etc. and that are also referred to as "compounds" or "premix" are particularly suitable. These additives may be liquid or solid. The presence of a heat stabilizer is particularly recommended since the process according to the invention involves a pressurized heating step. This stabilizer is preferably present in an amount of at least 3 phr (parts per 100 parts of resin), or at least 5 phr, and even up to 10 phr. It may be of any type (Pb, Ca—Zn, Sn, etc., the latter giving good results, in particular when liquid). It would appear, on the other hand, that the customary formulations that include processing aids may be simplified, especially by omitting said aids.

The long fibers used in the process according to the invention may be any commercially available fibers. They may be organic fibers (from natural products such as hemp for example, or from synthetic products such as polymeric fibers) and also mineral fibers (glass fibers for example). The process according to the invention gives good results with glass fibers. Within the context of the invention, the expression "long fibers" is understood to mean fibers having a length of the order of cm, preferably greater than or equal to 10 cm, or even several tens of cm (this length could even be of the order of meters).

These fibers may or may not be woven and the network according to the invention may or may not be ordered. Good results have been obtained with fibers that are simply entangled and, in particular, with long, entangled glass fibers.

The method of dispersing the powder onto and into the network and then of moulding the sheet is described in detail in the aforementioned international Applications WO 99/22920 and WO 2005/038123, the content of which is incorporated by reference in the present application.

The present application also relates to a composite structure having a cellular core and at least one sheet based on PVC reinforced with long fibers capable of being obtained by the process described previously. It should be noted that such a structure could also be of interest outside of the context of the present invention (i.e. that the sheets of PVC/long, preferably glass, fibers could have been obtained by another process).

Preferably, the composite structure is a sandwich structure having such a sheet as reinforcement on both sides of the cellular core. Preferably, the long fibers are glass fibers, which makes it possible to obtain a structure that has a good fire resistance.

The advantage of these structures is in being able to use sheets of thinner thickness for a given structural rigidity or to attain a greater structural rigidity at a given sheet thickness. The impact resistance conferred by the sheets is also an asset.

Preferably, the cellular core comprises a honeycomb structure. The term "honeycomb" is understood to mean an object that is generally flat (in the general form of a sheet) or slightly curved and that comprises cells, that is to say open or closed cells having any, but generally circular or hexagonal, cross section with walls that are essentially parallel from one cell to another and perpendicular to the surfaces of the reinforcing sheet according to the invention. Most particularly preferably, this honeycomb structure is also made of PVC. It may or may not comprise foam within it as described in the aforementioned Application WO 2006/045723, the content of which is, for this purpose, incorporated by reference in the present application.

The term "foam" is understood to mean a material whose density has been reduced by the addition of additives known by the name "blowing agents". Such additives are well known in the plastic processing industry. They may be of various types, often grouped together in two families: chemical blowing agents and physical blowing agents. It is also possible to mix them. Information on this subject can be found in numerous technical works. The reductions in density vary greatly depending on the blowing agent and the amount used. Generally, the term "foam" is understood to mean a material whose density has been reduced to less than 20% of its initial value (without blowing agents), or to less than 10% of this value, and even to less than 5% of this value, for identical pressure and temperature conditions. Preferably, the expanded material is a plastic.

In one variant, the invention also relates to a structure that has a cellular core comprising a PVC-based honeycomb structure filled with PUR foam and two outer sheets made of PVC reinforced with long glass fibers. Most particularly preferably, the two outer sheets are attached to a PVC honeycomb filled with PUR foam and are separated by a layer of honeycomb-free PUR foam.

The honeycomb structure according to the invention may be obtained in any known manner. Preferably, it is obtained by extrusion and most particularly preferably, it is obtained by the process that is the subject of the co-pending Application PCT/EP2006/065385 in the name of the Applicant, the content of which is also incorporated by reference in the present application.

In this process:
continuously extruding parallel lamellae of a composition based on at least one plastic, in an approximately horizontal direction, through a die having a front face provided with a plurality of parallel slots and with an insulating material, at least on the surface; and
upon exiting the die, subjecting the spaces lying between two adjacent lamellae, in successive alternations and between two sizing units whose length is short enough for the plastic composition to remain molten, to an injection of compressed gas and to a vacuum, the two sides of a same lamella being respectively, for one side, subjected to the action of the compressed gas and, for the other side, subjected to the action of the vacuum, and vice versa during the next alternation, so as to deform the lamellae and weld them together in pairs, with formation, in a plane approximately parallel to the extrusion direction, of a cellular structure whose constituent cells extend perpendicular to the extrusion direction.

The honeycomb and the reinforced PVC sheet or sheets may be assembled in any known manner: bonding, welding, etc. In the case where the honeycomb comprises foam, this foam may be generated in situ and may also be used to attach the sheet(s) and the honeycomb (as described in the aforementioned Application WO 2006/045723).

Finally, the present invention also relates to the use of sheets obtained by the process described above and/or of composite structures as described above in the building industry/in construction and, in particular, in walls, ceilings, floors and concrete formwork, applications for which the rigidity, creep resistance and impact resistance are important. The fact of being able to reduce the thicknesses of the walls while having the same performance is also an asset. In particular, the composite structures are beneficial in these applications.

The process according to the invention is illustrated in a non-limiting manner by the following example:

The following formulation ("premix") was prepared:

| Products | phr |
| --- | --- |
| PVC S250 | 100 |
| Baerostab MSL | 10 |
| Paraloid K120N | 1 |
| Paraloid K175 | 1.5 |
| Loxiol G60 | 1.5 |

The particle size of the formulation was of the order of 300 µm.

The ingredients therein were:
PVC 5250 resin: K value ($K_w$)=50;
Baerostab MSL: liquid organotin (carboxylate) type heat stabilizer;
Paraloid K120N: processing aid (acrylic polymer)
Paraloid K175: processing aid that makes it possible to reduce bonding and plate-out; and
Loxiol G60: stearate-based wax.

They were mixed in a Henschel mixer according to the following procedure:
mixing the solids in the first mixer and leaving running at a low speed for 5 min;
then raising the temperature to 60° C., while mixing at a high speed, in steps of 2 to 3° C. and returning to the low speed in order not to overheat the blades too much;
at 60° C., running at low speed and introducing the liquids;
gradually raising the temperature to 90° C., returning to the low speed and emptying into the cold mixer; and
leaving to cool for 10 to 15 min.

PVC sheets were manufactured using this formulation under the following conditions (conforming to the invention):
Unwinding speed: 2.5 in/min;
Width: 1100 mm;
Reinforcement:
  Reference of the reinforcement: Vetrotex P243 2400 tex glass fiber;
  Number of rovings: 15
  Roving speed: 1100 g/min;
  chopper position: 4.1
Matrix
  Powder flow rate: 1650 g/min;
  powder-scattering unit position: 22.6%
Electrostatic treatment:
  Voltage: 10 kV;
  Distance between electrodes: 4 mm;
Flat calendering (pressing):
  Maximum temperature: 200° C.;
  Cooling temperature: 20° C.;
  Pneumatic pressure applied to the calender: 5 bar;
  Distance between belts: 0.3 mm;

For comparison purposes, sheets were pressed under similar conditions, based on a formulation identical to that expressed above but without glass fibers and without electrostatic treatment ("reference PVC").

The mechanical properties of the sheets according to the invention and of the comparison sheets were measured and the results obtained are recorded in the following tables:

1/ Evaluations Carried Out on the Product as is (Thickness: 0.7 mm).

| Measurement | Standard | PVC/Glass fibers | Reference PVC |
|---|---|---|---|
| Tensile modulus (0.05%-0.25%) (MPa) | ISO 527-4 | L direction (*): 4341<br>T direction (*): 3849<br>45° (*): 4509 | 2820 |
| Instrumented falling weight: Resilience (J/mm) | ISO 6603-2 (2000-10-01 edition) | 5.9 | 0.037 |

(*) L direction = direction parallel to the machine direction
T direction = direction perpendicular to the machine direction
45° = along an angle of 45° relative to the two L and T directions 2/ Evaluations Carried Out on Several Sheets Pressed so as to Increase the Thickness and Allow these Evaluations (Thickness: 1.85 mm):

| Measurement | Standard | PVC/Glass fibers | Reference PVC |
|---|---|---|---|
| Flexural modulus (8-14 MPa) (MPa) | ISO 178 (2001) | 7038 | 3278 |
| Instrumented falling weight: Resilience (J/mm) | ISO 6603-2 (2000-10-01 edition) | 7.221 | 0.224 |

CONCLUSIONS

The product reinforced with glass fibers has a mechanical behaviour substantially above that of the unfilled product. The filled product has very good impact strength whereas the reference PVC is very brittle.

The invention claimed is:

1. A process for manufacturing a composite sheet comprising:
    dispersing PVC in powder form in a network of long fibers in the absence of an electric field to form a dispersion;
    subjecting the dispersion to an alternating electric field with a sufficient intensity and for a sufficient time to distribute the powder in the network and form an initial matrix; and
    heating the initial matrix under pressure until the powder therein forms a continuous matrix.

2. The process according to claim 1, wherein the PVC has a melt viscosity index or K value ($K_w$ or K-wert) less than or equal to 68.

3. The process according to claim 1, wherein the PVC in powder form is constituted by particles having an average diameter less than or equal to 300 µm.

4. The process according to claim 1, wherein the long fibers are glass fibers.

5. The process according to claim 1, wherein the long fibers are non-woven but entangled.

6. The process according to claim 1, further comprising joining said composite sheet with at least one side of a cellular core.

7. The process according to claim 6, wherein the cellular core comprises a PVC honeycomb.

8. The process according to claim 7, wherein the PVC honeycomb is filled with PUR foam.

9. The process according to claim 1, wherein said PVC is a vinyl chloride homopolymer.

10. The process according to claim 1, wherein said PVC is a vinyl chloride/vinyl acetate copolymer.

11. The process according to claim 1, wherein said PVC has a melt viscosity index or K value ($K_w$ or K-wert) of 50-60.

12. The process according to claim 1, wherein the PVC in powder form is constituted by particles having an average diameter less than or equal to 150 µm.

13. The process according to claim 1, further comprising joining two of said composite sheets on opposite sides of a cellular core.

14. The process according to claim 13, wherein the cellular core comprises a PVC honeycomb.

15. The process according to claim 14, wherein the PVC honeycomb is filled with PUR foam.

* * * * *